(12) United States Patent
Wang

(10) Patent No.: US 10,802,570 B2
(45) Date of Patent: Oct. 13, 2020

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Xiaoli Wang, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 306 days.

(21) Appl. No.: 16/010,826

(22) Filed: Jun. 18, 2018

(65) Prior Publication Data

US 2018/0364793 A1 Dec. 20, 2018

(30) Foreign Application Priority Data

Jun. 20, 2017 (JP) .................. 2017-120809

(51) Int. Cl.
| | | |
|---|---|---|
| *G06F 12/00* | (2006.01) | |
| *G06F 1/3287* | (2019.01) | |
| *G06F 1/3206* | (2019.01) | |
| *G06F 1/3234* | (2019.01) | |
| *G03G 15/00* | (2006.01) | |
| *G06F 12/02* | (2006.01) | |

(52) U.S. Cl.
CPC ....... *G06F 1/3287* (2013.01); *G03G 15/5004* (2013.01); *G06F 1/3206* (2013.01); *G06F 1/3268* (2013.01); *G06F 12/0238* (2013.01)

(58) Field of Classification Search
CPC .... G06F 1/3287; G06F 1/3206; G06F 1/3268; G06F 12/0238; G06F 12/0246; G03F 15/5004
See application file for complete search history.

(56) References Cited

U.S. PATENT DOCUMENTS

2012/0022797 A1* 1/2012 Maruyama ......... G05B 23/0283
702/34

FOREIGN PATENT DOCUMENTS

JP 2011221708 A 11/2011

* cited by examiner

*Primary Examiner* — Shawn X Gu
(74) *Attorney, Agent, or Firm* — Carter, Deluca & Farrell LLP

(57) ABSTRACT

An information processing apparatus is equipped with a storage and obtains a remaining life time of the information processing apparatus, sets a minimum off/on time interval for a power supply of an equipped storage based on the obtained remaining life time of the information processing apparatus and a remaining number of times of power supply of the storage can be turned off/on, and controls so that a transition is made to a sleep mode in a state in which the minimum off/on time interval for the power supply of the storage that is set is ensured.

10 Claims, 8 Drawing Sheets

FIG. 4A

| | TYPICAL HDD | SERVER HDD | SSD |
|---|---|---|---|
| ALLOWABLE NUMBER OF TIMES FOR OFF/ON | APPROXIMATELY 300,000 | APPROXIMATELY 600,000 | APPROACHING INFINITY |
| ENERGIZED PERIOD | 200,000 TO 300,000 HOURS | TYPICAL HDD OR BETTER | APPROACHING INFINITY |

FIG. 4B

GIVEN THAT THE LIFE TIME OF AN IMAGE FORMING APPARATUS IS FIVE YEARS AND THE NUMBER OF OFF/ON FOR POWER SUPPLY OF A TYPICAL HDD IS 300,000 TIMES, ON AVERAGE AN OFF/ON INTERVAL IS FIVE YEARS / 300,000 TIMES = 8.76 MINUTES/TIME

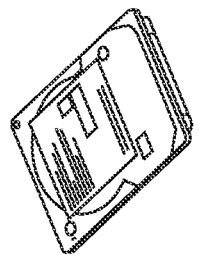
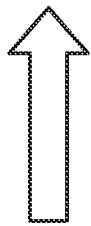
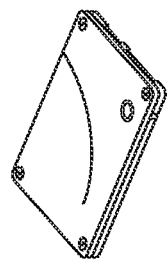
FIG. 6A  REPLACE WITH SSD
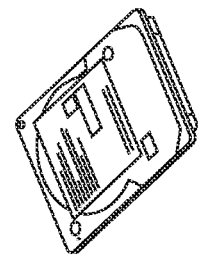
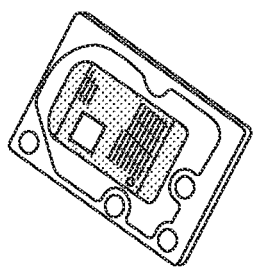
FIG. 6B  SWITCH TO HDD OF DIFFERENT TYPE
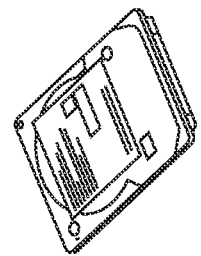
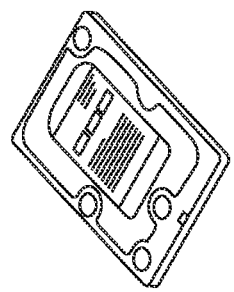
FIG. 6C  SWITCH TO RECYCLED HDD

FIG. 8A
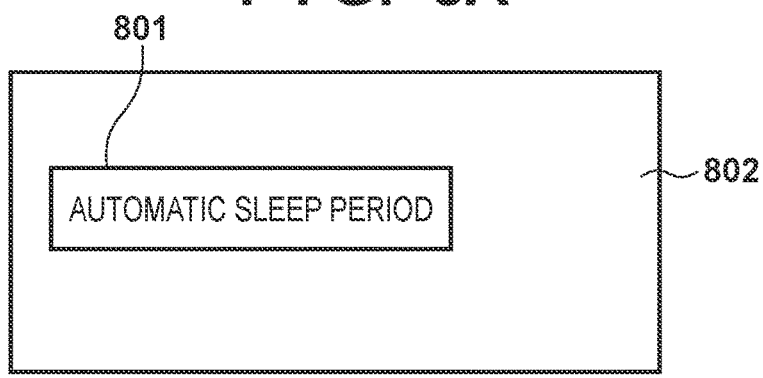
FIG. 8B
| MODEL NAME | MODEL NUMBER | CAPACITY | LIFE TIME |
|---|---|---|---|
| WD xxx | WD30EFRX | 3TB | 600,000 TIMES |
| Seagate yyy | ST6000DM008 | 6TB | 300,000 TIMES |
| HGST zzz | HUH728080ALE600 | 8TB | 800,000 TIMES |
| Samsung aaa | PM961 | 256GB | INFINITY |
FIG. 8C
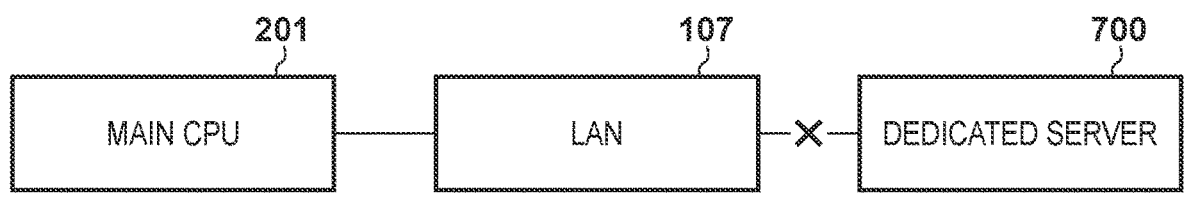

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

An electronic device that is a typical information processing apparatus has a secondary storage device for storing data required for operation, and an HDD (hard disk drive) for example is often used as such a secondary storage device. To realize power saving, such an electronic device is equipped with a power saving function for automatically transitioning from a standby mode (normal operation mode) to a sleep mode (a power saving mode) in a case where there is no input of an instruction from a user and no input or the like of a job for a certain amount of time period. In the sleep mode, power supply to the secondary storage device is stopped in order to suppress power consumption to be as small as possible, and power supply to the secondary storage device is restarted upon returning from the sleep mode to the standby mode. In other words, power supply to the secondary storage device is turned off/on in accordance with transition back and forth between the standby mode and the sleep mode.

An HDD used as the secondary storage device has life time restrictions (restriction on the number of times it can be turned off/on). Accordingly, when transition to the sleep mode described above frequently occurs, for example, a situation where the HDD malfunctions within the life time of the electronic device in which that HDD is equipped (approximately five years) occurs. In such a case, replacement of the HDD becomes necessary, and extra cost arises.

To handle such a problem, Japanese Patent Laid-Open No. 2011-221708 discloses an information processing apparatus that lengthens the life time of an HDD as much as possible to reduce the number of times a power supply in the HDD is turned off/on by restricting a time interval for transitioning from the standby mode to the power saving mode.

In the above conventional technique, in a state where the power supply of an information processing apparatus equipped with an HDD is on, elapsed time ta after the power supply is turned on is measured, and a comparison is made between the elapsed time ta and a total of a lower-limit threshold value L and a reference time S (an on/off time interval for turning the power supply on/off a defined number of times). When ta>L+S, a transition is made to the power saving mode.

In recent years, the unit price of an SSD (solid state drive) has greatly reduced, and cases where an apparatus is installed with an SSD instead of an HDD are increasing. Consequently, there is the possibility that HDDs will cease to be equipped to the extent that they have been up until now, and also a different HDD to what was installed at the start of production of an apparatus may be installed, a different type of HDD may be switched to at a time of a malfunction. There is also the possibility that an HDD will be switched to an SSD during the apparatus life time, for example. Consequently, when the time interval for enabling a transition to the power saving mode is made constant as in the conventional case, it is not possible to use the life time of storage sufficiently in the case of an SSD or an HDD having a longer life time, and power is wastefully consumed. In addition, in a case where a storage is replaced with a second-hand HDD or an HDD having a shorter life time, there is a risk that it will not be possible to sufficiently conserve the storage, and the storage will fail before the life time of the apparatus.

SUMMARY OF THE INVENTION

An aspect of the present invention is to eliminate the above-mentioned problem with conventional technology.

A feature of the present invention is to provide a technique for enabling the life time of a storage to be used sufficiently, and for suppressing power consumption.

According to a first aspect of the present invention, there is provided an information processing apparatus equipped with a storage, the apparatus comprising: a memory device that stores a set of instructions; and at least one processor that executes the instructions stored in the memory to: obtain a remaining life time of the information processing apparatus; set a minimum off/on time interval for a power supply of an equipped storage based on the remaining life time of the information processing apparatus and a remaining number of times of power supply of the storage can be turned off/on; and control to transition to a sleep mode in a state in which the minimum off/on time interval for the power supply of the storage is ensured.

According to a second aspect of the present invention, there is provided a method of controlling an information processing apparatus equipped with a storage, the method comprising: obtaining a remaining life time of the information processing apparatus; setting a minimum off/on time interval for a power supply of an equipped storage based on the obtained remaining life time of the information processing apparatus and a remaining number of times of power supply of the storage can be turned off/on; and controlling so that a transition is made to a sleep mode in a state in which the minimum off/on time interval for the power supply of the storage that is set is ensured.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B depict views for describing examples of sleep time intervals that correspond to types of storage.

FIGS. 6A through 6C depict views for describing examples of replacing a malfunctioning HDD.

FIGS. 8A through 8C depict views for respectively describing a console unit of the image forming apparatus according to the embodiments, a life time table, and a connection with a server.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
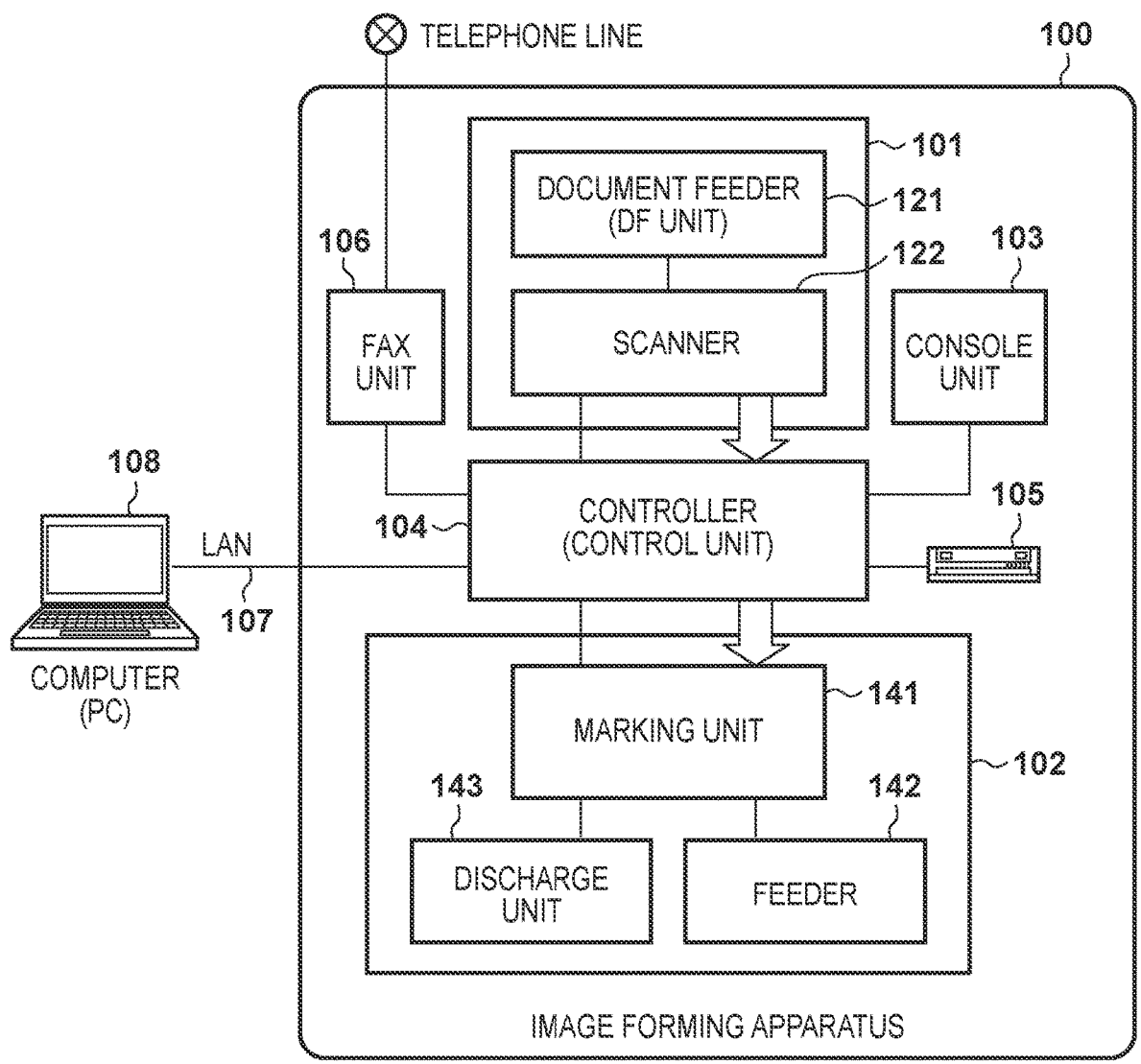
FIG. 1 is a block diagram for describing a configuration of an image forming apparatus according to embodiments.

FIG. 1 is a block diagram for describing a configuration of an image forming apparatus 100 according to embodiments. Note that, in the embodiments, exemplary description is given of the image forming apparatus 100 as an example of an information processing apparatus according to the present invention. The image forming apparatus 100 is described as an example of a multifunction peripheral provided with a function for reading an original document, a facsimile transmission/reception function, a print function, a box function, and the like, but the present invention is not limited to such a multifunction peripheral, and the image forming apparatus 100 may be an electronic device such as a mobile terminal, a communication apparatus, or a PC.

The image forming apparatus 100 has a scanner unit 101 for optically reading an image of an original document and converting it to a digital image signal, a printer unit 102 for printing an image onto a sheet based on a digital image signal, and a console unit 103 for controlling an interface with a user. The image forming apparatus 100 also has a controller (control unit) 104 for controlling the apparatus as a whole, a large-capacity storage apparatus (hereinafter, a HDD) 105 for storing digital image data, a control program, and the like, and a FAX unit 106 for transmitting a digital image by a telephone line or the like. In addition, for the image forming apparatus 100, device instructions, issuance of jobs, and performance of input/output of digital image data with a computer (PC) 108 via a LAN 107 are also possible.

The scanner unit 101 has a document feeder 121 for stacking a bundle of original documents and feeding from the bundle of original documents one at a time to a scanner 122, and the scanner 122, which is for optically scanning an original document and converting an image of the original document into a digital image signal. The image signal generated by the scanner 122 is transmitted to the controller 104. The printer unit 102 is provided with a feeder 142 that is capable of consecutively feeding one sheet at a time from a bundle of sheets, a marking unit 141 for printing on a fed sheet an image based on image data, and a discharge unit 143 for discharging a sheet after printing.

In addition, the computer (PC) 108 transmits a print job or the like to the image forming apparatus 100 via the LAN 107 to cause the job to be executed. In the embodiment, when the computer 108 outputs an off instruction to the controller 104, the controller 104 controls an off process of the image forming apparatus 100.

Next, description is given regarding functions that the image forming apparatus 100 according to the embodiments has.

Copy Function

Image data of an original document that has been read by the scanner unit 101 is stored in the HDD 105, and the printer unit 102 is used at the same time to perform printing.

Image Transmission Function

Image data generated by the scanner unit 101 reading an original document is transmitted to the computer 108 via the LAN 107.

Image Saving Function (Box Function)

Image data generated by the scanner unit 101 reading an original document is stored in the HDD 105, and transmission or printing are performed as necessary.

Image Printing Function

A page description language, for example, that is included in a print job received from the computer 108 is analyzed, and printing is performed by the printer unit 102.

Figure 2:
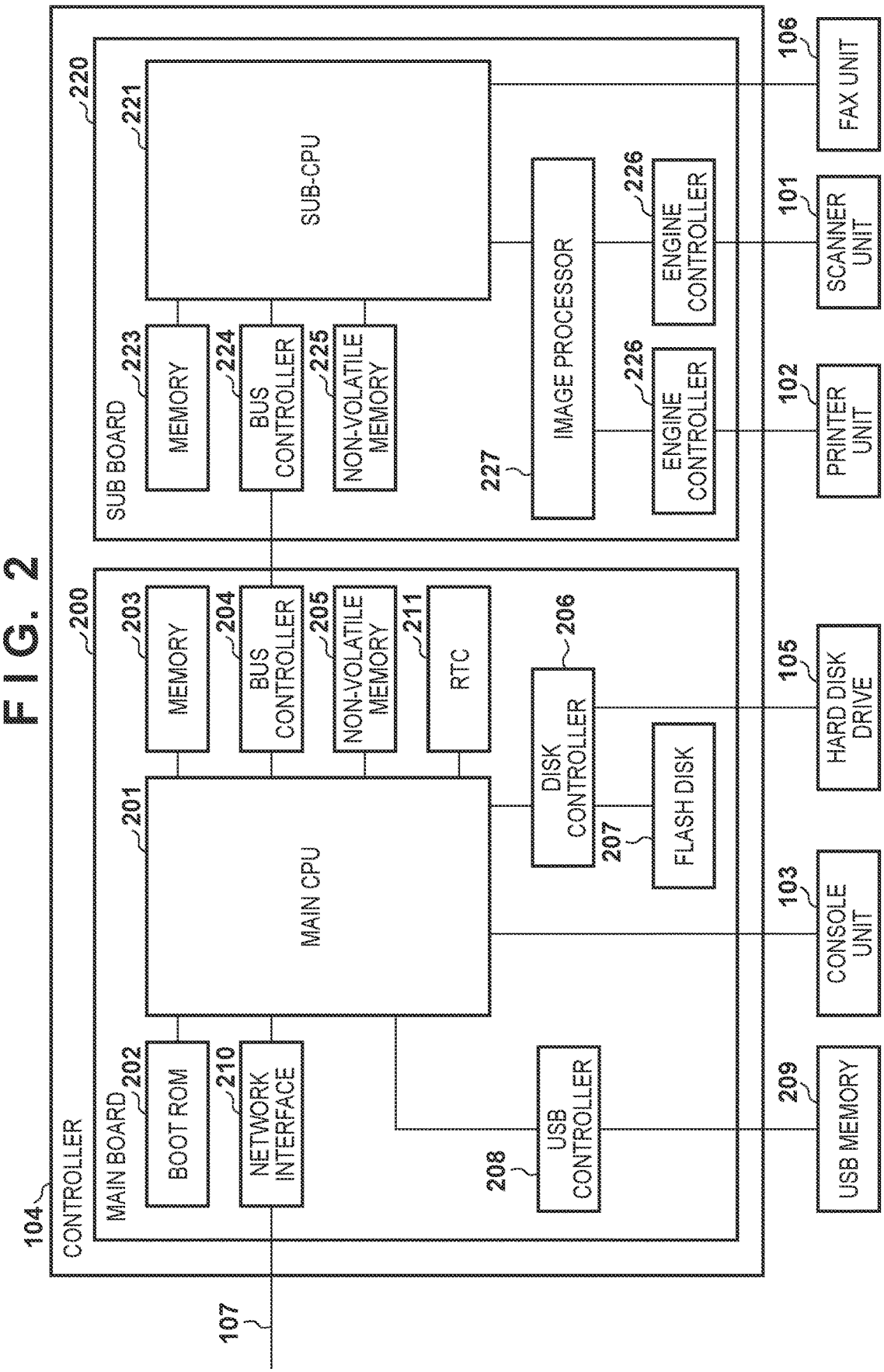
FIG. 2 is a block diagram for describing a hardware configuration of a controller (control unit) of the image forming apparatus according to the embodiments.

FIG. 2 is a block diagram for describing a hardware configuration of the controller 104 of the image forming apparatus 100 according to the embodiments.

The controller 104 includes a main board 200 and a sub board 220. The main board 200 is a so-called general-purpose CPU system. It has a main CPU 201 for controlling the board as a whole, a boot ROM 202 storing a boot program, a memory 203 that the CPU 201 uses as a work memory, a bus controller 204 having a function as a bridge to an external bus, and a non-volatile memory 205. Furthermore, it has an RTC (Real Time Clock) 211 having a clock function, a disk controller 206 for controlling a storage apparatus such as the HDD 105, and flash disk (an SSD or the like) 207 which is a comparatively low capacity non-volatile storage device configured by a semiconductor device. Furthermore, it has, for example, a USB controller 208 for connecting to a USB memory 209. The USB memory 209, the console unit 103, the HDD 105, and the like are connected to the main board 200. In addition, it is assumed that the main CPU 201 can determine whether the HDD 105 is connected as a storage or whether a storage of another type is connected, in accordance with a controller of the storage to which a connection is made. A network interface 210 is connected to the LAN 107, and transmits/receives data via the network.

The sub board 220 has a comparatively small general-purpose sub-CPU system, and image processing hardware. It has a sub-CPU 221 for controlling the board as a whole, and a memory 223 that the CPU 221 uses as a work memory. Furthermore, it has a bus controller 224 having a bridge function with the external bus, a non-volatile memory 225, an image processor 227 for performing digital image processing in real time, and engine controllers 226. The scanner unit 101 and the printer unit 102 transfer digital image data via the engine controllers 226. In addition, the sub-CPU 221 directly controls the FAX unit 106. Note that this block diagram is illustrated as simplified. For example, the main CPU 201, the sub-CPU 221, or the like include a large number of pieces of CPU peripheral hardware such as chip sets, bus bridges, and clock generators. However, these are omitted as they are unnecessary for the description of the present invention, and this block configuration does not limit the present invention.

Next, description is given for operation of the controller 104 according to the embodiments, by taking copying to a sheet as an example.

When a user instructs copying from the console unit 103, the main CPU 201 sends a read instruction for an original document to the scanner unit 101 via the sub-CPU 221. The scanner unit 101 optically scans the original document to convert it to digital image data, and the image data is inputted to the image processor 227 via the engine controller 226. The image processor 227 temporarily saves the digital image data in the memory 223 by a DMA transfer.

Upon confirming that a certain amount or all of the digital image data has been stored in the memory 223, the main CPU 201 outputs an image output instruction to the printer unit 102 via the sub-CPU 221. As a result, the sub-CPU 221 notifies an address of the image data in the memory 223 to the image processor 227. In accordance with a synchronization signal from the printer unit 102, the image processor 227 outputs the image data from the memory 223 to the printer unit 102 via the image processor 227 and the engine controller 226. In this way, an image based on the digital image data is printed on a paper (a sheet) by the printer unit 102.

In a case of performing printing of a plurality of copies, the main CPU 201 saves the image data of the memory 223 in the HDD 105. Because of this, for second and subsequent copies, the image can be printed by the printer unit 102 without receiving image data from the scanner unit 101.

Figure 3A:
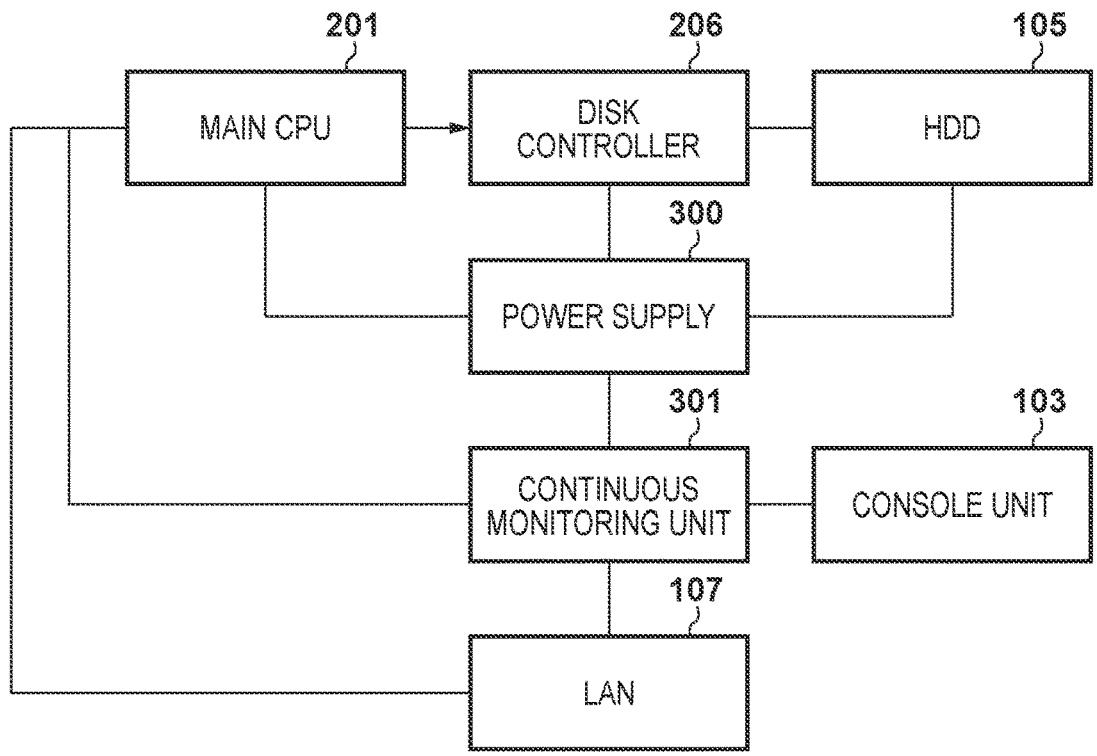
FIGS. 3A and 3B are block diagrams for describing power modes for supply of power in the image forming apparatus according to the embodiments.
Figure 3B:
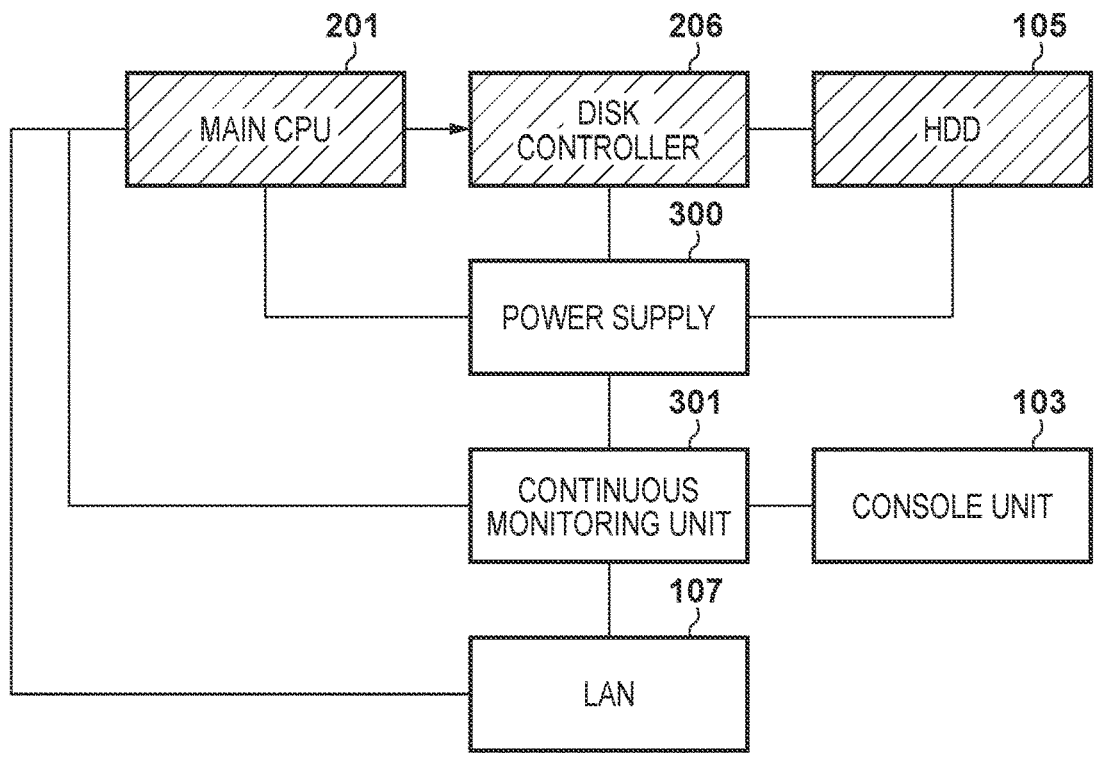

FIGS. 3A and 3B are block diagrams for describing power modes for supply of power in the image forming apparatus 100 according to the embodiments. In FIGS. 3A and 3B, description is given for only portions according to the embodiments out of portions indicated in the block diagram of the image forming apparatus 100 described above. Because description is given only for the minimum number of portions necessary for the description of the present invention, an implementation of the present invention is not limited to this description.

Here, the main CPU 201, the HDD 105 that stores data, and the disk controller 206 that operates as an interface between the main CPU 201 and the HDD 105 are given as examples. A power supply 300 supplies power to apparatuses. A continuous monitoring unit 301 operates irrespective of whether it is standby mode or sleep mode.

The continuous monitoring unit 301 controls the power supply 300 after receiving an instruction from the main CPU 201. In addition, during the sleep mode, the continuous monitoring unit 301 monitors the LAN 107 and the console unit 103, and when a condition for returning from the sleep mode is satisfied (for example, a press of a button on the console unit 103 or arrival of a notification from a PC via the LAN 107), the continuous monitoring unit 301 makes an instruction to the power supply 300, and causes the system to resume.

Next, description is given regarding an energization unit at a time of the standby mode and a time of the sleep mode.

FIG. 3A illustrates a state of the standby mode, and power is supplied to all devices at this point.

FIG. 3B illustrates a state of the sleep mode, and supply of power to the main CPU 201, the disk controller 206, and the HDD 105 is stopped.

With such a configuration, when a transition is made from the standby mode to the sleep mode, or when the standby mode is returned to from the sleep mode, the power supply to the HDD 105 is turned on or off.

FIGS. 4A and 4B depict views for describing examples of sleep time intervals that correspond to types of storage.

As illustrated by FIG. 4A, an allowable number of times that the power supply for a typical HDD can be turned off/on is approximately 300,000 times. In contrast to this, the allowable number of times that the power supply for an HDD for a server can be turned off/on is approximately 600,000 times. Furthermore, the allowable number of times that the power supply for an SSD can be turned off/on is a number approaching infinity.

Assuming that the designed life time of an image forming apparatus is five years, if the HDD malfunctions within the five year life time of the image forming apparatus, the HDD will be replaced by a service person, and therefore there is a risk that a user will temporarily not be able to use the image forming apparatus.

In FIG. 4B, when it is assumed that the design life time of the image forming apparatus is five years, if a calculation is made assuming that the power supply to an HDD is turned off/on 300,000 times during those five years, the off/on time interval is 8.76 minutes at a minimum. Consequently, it is assumed that the off/on time interval is 10 minutes in a typical example.

However, when the off/on time interval for is set in this way, when a predetermined amount of time (ten minutes) has not elapsed from a time when the power supply for the HDD was turned off/on previously, even if a condition for transitioning to the sleep mode is satisfied, a situation where it is not possible to transition to the sleep mode occurs. When a situation where it is not possible to transition to the sleep mode occurs in this way, there is a problem of increased time over which power is wastefully consumed, and it is not possible to reduce power consumption.

Figure 5:
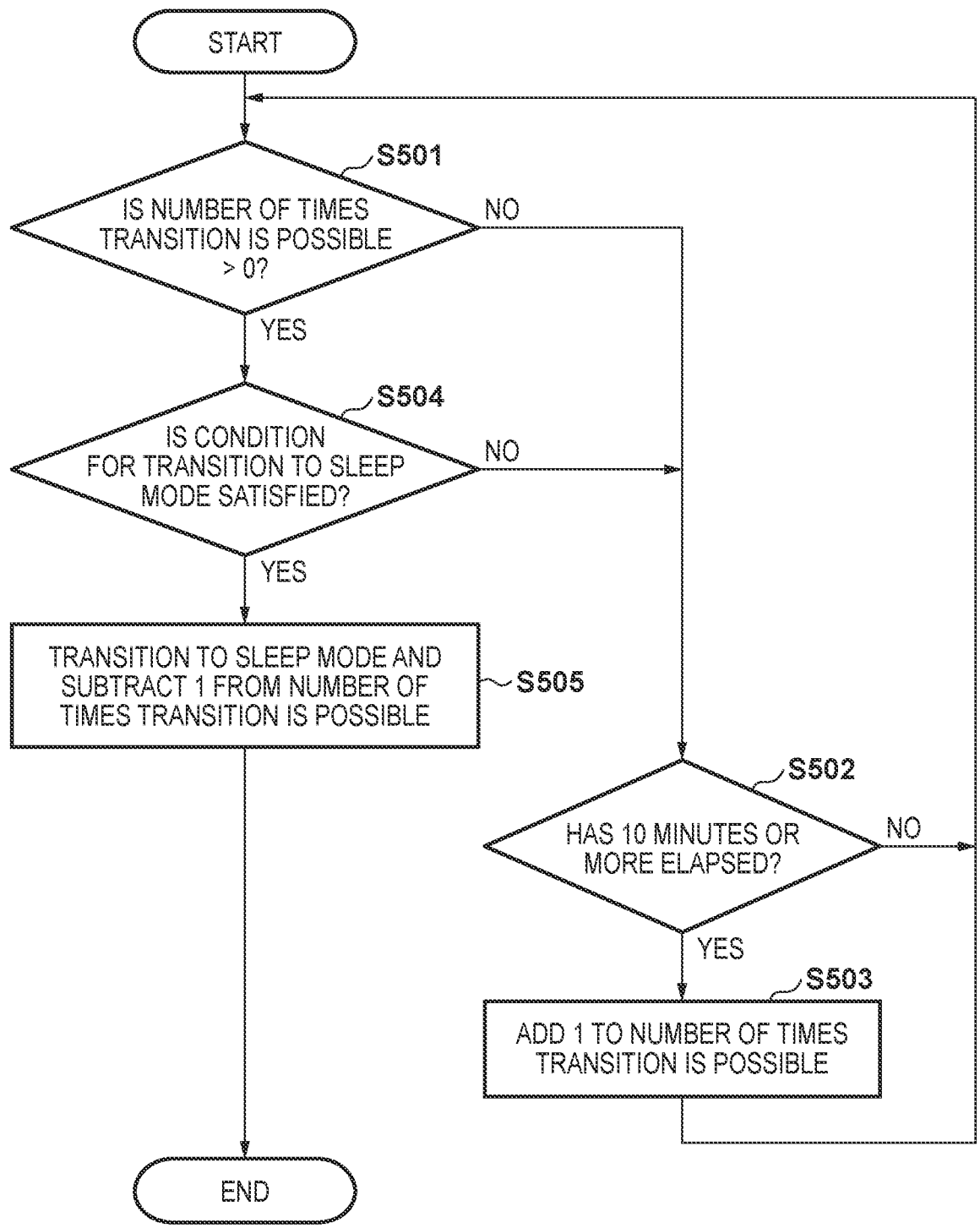
FIG. 5 is a flowchart for describing processing when the image forming apparatus according to the embodiments transitions to a sleep mode (a power saving mode).

FIG. 5 is a flowchart for describing processing when the image forming apparatus 100 according to the embodiments transitions to a sleep mode (a power saving mode). Description is given here for an example where at least ten minutes are guaranteed for the off/on time interval.

When processing is started, firstly, in step S501, the image forming apparatus determines in the standby state whether or not it is possible to transition to the sleep state, in other words whether or not the number of times that sleep is possible (a count value of a counter) is greater than "0". When it is determined here that the number of times that sleep is possible is greater than "0", the processing proceeds to step S504, otherwise the processing proceeds to step S502. In step S502, the image forming apparatus determines whether or not it is in the standby state and whether a predetermined amount of time (here, the ten minutes described above) has elapsed continuously in the standby state. When it is determined that ten minutes have elapsed, the processing proceeds to step S503, the number of times that sleep is possible described above has +1 added thereto (the number of times is incremented), and the processing proceeds to step S501. Meanwhile, when it is determined in step S502 that ten minutes have not elapsed, the processing proceeds to step S501.

In step S504, the image forming apparatus determines whether or not a condition that enables a transition to the sleep mode has been satisfied in accordance with, for example, no operation being made by a user or no job being inputted for a predetermined amount of time. When it is determined here that the condition that enables transition to the sleep mode is satisfied, the processing proceeds to step S505, otherwise the processing proceeds to step S502. In step S505, the image forming apparatus subtracts 1 from (decrements) the number of times that sleep is possible, and transitions to the sleep mode. Note that this counter is stored in the non-volatile memory 205 or the HDD 105.

In this way, when the image forming apparatus is in the standby state, the number of times that the off/on time interval for power supply described above has become ten minutes or more is stored as the number of times that sleep is possible. Because of this, during the design life time of the image forming apparatus, it is possible to perform control such that an average of the off/on time intervals for power supply to the HDD does not fall below a predetermined amount of time (ten minutes here).

FIGS. 6A through 6C depict views for describing examples of replacing a malfunctioning HDD.

As described above, in recent years, amid the shift of storage from HDD to SSD, if an HDD of an image forming apparatus malfunctions, there are cases where it is not possible to obtain an HDD of the same type. Consequently, as examples of replacing a malfunctioning HDD, the following three cases can be considered.

FIG. 6A illustrates a case where there is a complete transition from an HDD to an SSD, which is a case where an HDD that malfunctioned is replaced with an SSD.

FIG. 6B illustrates a case where the same type of HDD cannot be obtained, and illustrates a case where an HDD that malfunctioned is replaced with a different type of HDD.

FIG. 6C illustrates a case where, when an HDD has malfunctioned, it is replaced by a recycled HDD (an HDD whose life time has been partially consumed) to reduce costs.

In the case of FIG. 6A, because an SSD has no limitation on the number of times a power supply is turned off/on due to its structure, there is no need to consider the off/on time interval. Consequently, when control of the number of times the power supply is turned off/on is performed similarly to before in spite of the fact that the HDD was replaced with an SSD, wasteful power consumption will occur.

In the cases of FIGS. 6B and 6C, when an HDD having a longer life time than the original HDD is equipped, the off/on time interval for power supply will lengthen more than is necessary, and wasteful power consumption will occur. In addition, in a case where an HDD having a shorter life time than the original HDD is equipped, there is the possibility that the life time of the HDD will be used up before the product life time of the apparatus is reached.

Figure 7A:
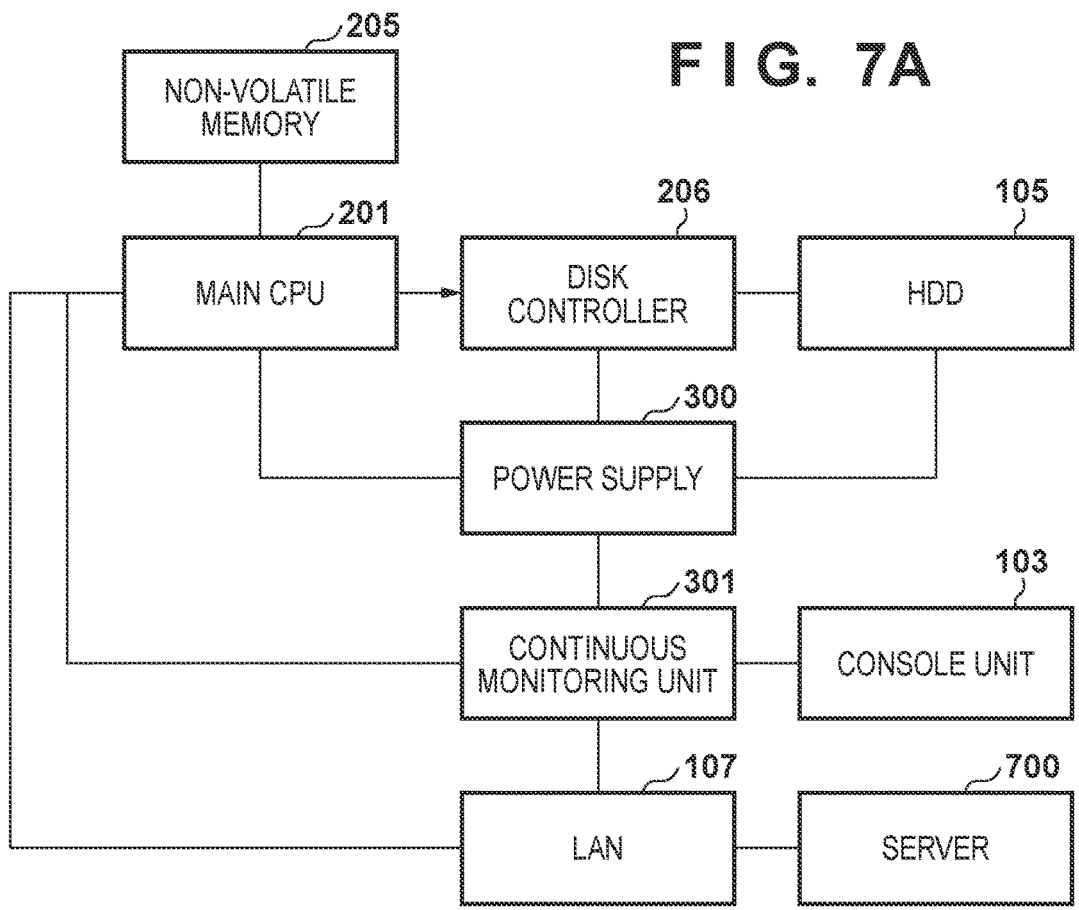
FIG. 7A is a block diagram for describing a configuration for controlling off/on time of power supply for the HDD in the image forming apparatus according to the embodiments.

FIG. 7A is a block diagram for describing a configuration for controlling off/on time of power supply for the HDD 105 in the image forming apparatus 100 according to the embodiments.

The main CPU 201 stores a date when the image forming apparatus 100 was first activated in the non-volatile memory 205. Accordingly, from that point onward the remaining life time of the image forming apparatus 100 is calculated by comparing the date and time of the first activation with the current date and time.

The main CPU 201 queries the HDD 105 (typically using a SATA (Serial Advanced Technology Attachment) command) through the disk controller 206 to obtain from SMART (Self-Monitoring, Analysis and Reporting Technology) information of the HDD 105 (information integrated in the HDD) the number of times that the power supply has already turned off/on by the HDD.

In addition, the main CPU 201 uses a model number obtained from the HDD 105 by a SATA command to, for example, query a server 700 via the LAN 107, and obtain a maximum allowable number of times that the power supply for the HDD 105 can be turned off/on.

The main CPU 201 calculates the remaining life time of the HDD 105 from this information. The main CPU 201 calculates the off/on time interval for the power supply for the HDD 105 for from that point onward from the remaining life time of the image forming apparatus 100 and the remaining number of times that the power supply for the HDD 105 can be turned off/on, and sets this time interval to the continuous monitoring unit 301. The continuous monitoring unit 301 controls the power supply 300 in accordance with the set time interval, and controls the turning off/on of the power supply for the HDD 105.

Figure 7B:
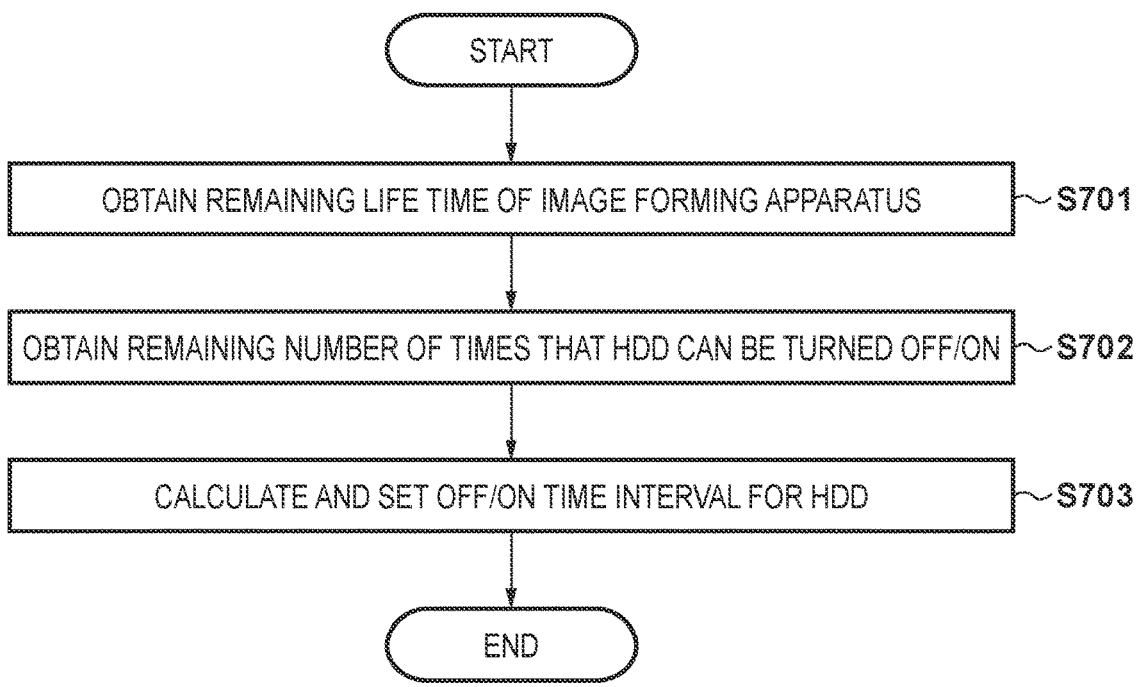
FIG. 7B is a flowchart for describing processing for obtaining and setting an off/on time interval of power supply for the HDD in the image forming apparatus according to the embodiments.

FIG. 7B is a flowchart for describing processing for the image forming apparatus 100 according to the embodiments to obtain and set the off/on time interval for power supply for an HDD. Note that processing illustrated by this flowchart is achieved by the main CPU 201 executing a program that has been deployed to the memory 203.

This processing is started by the power supply of the image forming apparatus 100 being turned on. Firstly, in step S701, the main CPU 201 obtains the remaining life time of the image forming apparatus 100 by using the date and time of the first activation that is stored in the non-volatile memory 205 of the image forming apparatus 100, the current date and time which is timed by the RTC 211, and the life time of the image forming apparatus 100. Next, the processing proceeds to step S702 and the main CPU 201 obtains the number of times that the power supply of the HDD 105 has already been turned off/on from the SMART information of the HDD 105, and the remaining life time (remaining number of times it can be turned off/on) from the maximum number of times that the power supply of the HDD 105 can be turned off/on. Next, the processing proceeds to step S703, and the main CPU 201 calculates the off/on time interval for power supply for the HDD 105 from the remaining life time of the image forming apparatus 100 and the remaining number of times that the power supply of the HDD 105 can be turned off/on, and sets the interval in the continuous monitoring unit 301.

The time interval set in this way is used as the predetermined amount of time when it is determined whether or not the predetermined amount of time has elapsed in step S503 of FIG. 5.

Note that, in this embodiment, the processing of FIG. 7B is started when the power supply of the image forming apparatus 100 is turned on, but the present invention is not limited to this.

Description is given using the examples below.

(A) Example 1: A case where a replacement with a new HDD (allowable number of times that the power supply can be turned off/on is 500,000) is made after an image forming apparatus whose design life time is five years is used for two years is as below. In this case, the new time interval is obtained by dividing a difference value (three years) obtained by subtracting the two years of use from the design life time of five years by the allowable number of times that the drive can be turned off/on (500,000 times).

$$(5-2) \text{ years}/500{,}000 \text{ times} = 3.15 \text{ (minutes/time)}$$

In this case, setting is made with respect to a control program so that the off/on time interval for power supply for the HDD is a minimum of four minutes.

(B) Example 2: A case where a replacement with a second-hand HDD (remaining allowable number of times that the power supply can be turned off/on is 100,000) is made after an image forming apparatus whose design life time is five years is used for two years is as below.

$$(5-2) \text{ years}/100{,}000 \text{ times} = 15.77 \text{ (minutes/time)}$$

In this case, setting is made with respect to a control program so that the off/on time interval for power supply for the HDD is a minimum of 16 minutes.

(C) Example 3: In a case where the HDD is replaced with an SSD, setting is made with respect to the control program so that the off/on time interval for power supply is zero minutes.

By virtue of the embodiment, because it is possible to shorten the off/on time interval for storage in the case of a replacement by a storage having a longer life time by dynamically setting the off/on time interval to the control program, it is possible to realize a reduction of power consumption.

In a case where a replacement is made by a storage having a shorter remaining life time, it is possible to conserve the storage by lengthening the off/on time interval for the storage.

FIG. 8A depicts a view illustrating an example of a button 801 for setting an automatic sleep period that is displayed on a display unit 802 of the console unit 103 of the image forming apparatus 100 according to the embodiments.

By pressing the button 801, a user can set an amount of time in units of the number of minutes to the number of hours as the elapsed time for transitioning to the sleep mode when a state in which a condition that enables the image forming apparatus 100 to transition to the sleep mode is satisfied continues. However, there is a risk of falling below the off/on time interval for power supply that is allowed by the storage in accordance with an amount of time set by a user.

At that time, the display unit 802 of the console unit 103 displays as per the user setting, but the controller 104 controls the time interval for transitioning to the sleep mode of the image forming apparatus 100 so that it becomes the off/on time interval for power supply that is allowed by the storage.

FIG. 8B depicts a view that illustrates an example of a life time table that stores in the image forming apparatus 100 model numbers of HDDs and their maximum life time. By referring to this information, it is possible to obtain information of an HDD in accordance with the model number of the HDD. However, in the case of a model number of an HDD that is not stored here, the maximum life time of the HDD is obtained by the image forming apparatus 100 querying the server 700, for example. The image forming apparatus 100, based on the data obtained from the server 700, updates data stored here or adds data.

In FIG. 8C, the main CPU 201, in a case where it cannot connect to the server 700 via the LAN 107, makes a calculation by using a typical life time as illustrated by FIG. 4A, for example. Typically, the maximum number of times that the power supply for a low cost HDD used by a PC or the like can be turned off/on is approximately 300,000 times.

Note that, the SMART information of an HDD is not constant in accordance with each manufacturer, and for example, as a start/stop count, the number of times that a spindle motor of the HDD rotates/stops as a ratio (%) with respect to a maximum number of 100,000 is stored, for example. In addition, there are cases where an accumulated amount of time that the power supply of the HDD is stored as a ratio (%) with respect to a maximum of 10 hours for example, as power on hour count.

Consequently, if the SMART information of an HDD contains this information, it is possible to obtain the remaining life time (energized period, number of times that the power can be turned off/on) of the HDD from these.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120809, filed Jun. 20, 2017, which is hereby incorporated by reference herein in its entirety.

What is claimed is:

1. An information processing apparatus equipped with a storage, the apparatus comprising:
    a memory device that stores a set of instructions; and
    at least one processor that executes the instructions stored in the memory to:
        obtain a remaining life time of the information processing apparatus;
        set a minimum off/on time interval for a power supply of an equipped storage based on the remaining life time of the information processing apparatus and a remaining number of times of power supply of the storage can be turned off/on; and
        control to transition to a sleep mode in a state in which the minimum off/on time interval for the power supply of the storage is ensured.

2. The information processing apparatus according to claim 1, further comprising a timer configured to time a current date and time,
    wherein the at least one processor that executes the instructions further to store, in a non-volatile manner, a date and time when the information processing apparatus is initially activated, and a design life time of the information processing apparatus,
    wherein the at least one processor obtains the remaining life time of the information processing apparatus based on the design life time of the information processing apparatus and a difference between the current date and time timed by the timer and the stored date and time when the information processing apparatus was initially activated.

3. The information processing apparatus according to claim 1, wherein the at least one processor obtains the minimum off/on time interval for the power supply of the storage based on a value obtained by dividing the remaining life time of the information processing apparatus by the remaining number of times of power supply in the storage can be turned off/on.

4. The information processing apparatus according to claim 1, wherein the at least one processor sets the minimum off/on time interval for the storage to 0, with respect to a control program, in a case where the equipped storage is a storage that does not have a limitation on the number of times for turning a power supply off/on.

5. The information processing apparatus according to claim 1, wherein the at least one processor executes the instructions further to increment each time an amount of time that a standby state continues equals the minimum off/on time interval, and decrement each time a transition is made to the sleep mode,
  wherein a condition for transitioning to the sleep mode includes a count value of the counter being larger than 0.

6. The information processing apparatus according to claim 1, wherein the at least one processor obtains, via a network, the remaining number of times that the power supply can be turned off/on in the equipped storage.

7. The information processing apparatus according to claim 1, wherein the at least one processor obtains, from SMART information of the storage, the remaining number of times that the power supply of the storage can be turned off/on.

8. The information processing apparatus according to claim 1, wherein the at least one processor executes the instructions stored in the memory device further to:
  in accordance with an instruction from a user, set, as a condition for transitioning to the sleep mode, an amount of time that a state where a condition that enables the sleep mode to be transitioned to is satisfied continues,
  wherein the at least one processor does not transition to the sleep mode if the minimum off/on time interval for the power supply of the storage cannot be ensured, even if the state where the condition that enables the transition to the sleep mode is satisfied continues for the amount of time that is set.

9. A method of controlling an information processing apparatus equipped with a storage, the method comprising:
  obtaining a remaining life time of the information processing apparatus;
  setting a minimum off/on time interval for a power supply of an equipped storage based on the obtained remaining life time of the information processing apparatus and a remaining number of times of power supply of the storage can be turned off/on; and
  controlling so that a transition is made to a sleep mode in a state in which the minimum off/on time interval for the power supply of the storage that is set is ensured.

10. A non-transitory computer-readable storage medium storing a program for causing a processor to execute a method of controlling an information processing apparatus equipped with a storage, the method comprising:
  obtaining a remaining life time of the information processing apparatus;
  setting a minimum off/on time interval for a power supply of an equipped storage based on the obtained remaining life time of the information processing apparatus and a remaining number of times of power supply of the storage can be turned off/on; and
  controlling so that a transition is made to a sleep mode in a state in which the minimum off/on time interval for the power supply of the storage that is set is ensured.

* * * * *